(12) United States Patent
Mercier et al.

(10) Patent No.: US 12,737,981 B2
(45) Date of Patent: Sep. 15, 2026

(54) TEXT-TO-IMAGE DIFFUSION MODELS FOR GENERALIZABLE MESH GENERATION

(71) Applicant: QUALCOMM Incorporated, San Diego, CA (US)

(72) Inventors: Antoine Clement Mercier, Loutraki (GR); Guillaume Jean Fernand Berger, Toronto (CA); Fatih Murat Porikli, San Diego, CA (US); Ramin Ebrahim Nakhli, Thornhill (CA)

(73) Assignee: QUALCOMM Incorporated, San Diego, CA (US)

( * ) Notice: Subject to any disclaimer, the term of this patent is extended or adjusted under 35 U.S.C. 154(b) by 380 days.

(21) Appl. No.: 18/537,496

(22) Filed: Dec. 12, 2023

(65) Prior Publication Data

US 2025/0191298 A1 Jun. 12, 2025

(51) Int. Cl.
*G06T 17/20* (2006.01)
*H04N 13/351* (2018.01)

(52) U.S. Cl.
CPC ........... *G06T 17/20* (2013.01); *H04N 13/351* (2018.05)

(58) Field of Classification Search
None
See application file for complete search history.

(56) References Cited

U.S. PATENT DOCUMENTS

2023/0237741 A1* 7/2023 Park ...................... G06T 15/205 345/420
2024/0171788 A1* 5/2024 Kreis .................... G06T 3/4053
2025/0184581 A1* 6/2025 Shi .......................... G06T 13/20

OTHER PUBLICATIONS

Li et al. "Instant3D: Fast Text-To-3D With Sparse-View Generation and Large Reconstruction Model", arXiv:2311.06214v2 [cs.CV] Nov. 23, 2023, (Year: 2023).*

Balaji et al. "ediff-i: Text-to-image diffusion models with an ensemble of expert denoisers." arXiv preprint arXiv:2211.01324 (2022)., (Year: 2022).*

Gupta A., et al., "3DGen: Triplane Latent Diffusion for Textured Mesh Generation", arXiv, arXiv:2303.05371v2, Mar. 27, 2023, XP093231070, 10 Pages, figures 1,5, section 2.

Li J., et al., "Instant3d: Fast Text-to-3D With Sparse-view Generation and Large Reconstruction Model", ArXiv.org, arXiv:2311.06214v2, Nov. 23, 2023, pp. 1-25, XP093231091, figures 1,2,3,8,10,12, section 3.1, paragraphs 1 to 5, section 3.2, paragraphs 1, 3, 4, section A.2, paragraph 3, section A.6, paragraphs 1, 9.

Mercier A., et al., "HexaGen3D: StableDiffusion is Just One Step Away from Fast and Diverse Text-to-3D Generation", arXiv:2401.07727v1, Jan. 15, 2024, pp. 1-11, XP093231047, The Whole Document.

(Continued)

*Primary Examiner* — Saptarshi Mazumder
(74) *Attorney, Agent, or Firm* — Patterson & Sheridan LLP

(57) ABSTRACT

Certain aspects of the present disclosure provide techniques and apparatus for improved machine learning. In an example method, a multiview latent tensor is generated based on processing a textual input using a diffusion machine learning model, where the multiview latent tensor corresponds to a plurality of orthographic projections corresponding to the textual input. A triplane latent tensor is generated based on the multiview latent tensor using a conversion machine learning model, and a three-dimensional mesh is generated based on processing the triplane latent tensor using a decoder machine learning model.

20 Claims, 7 Drawing Sheets

(56) References Cited

OTHER PUBLICATIONS

Partial International Search Report—PCT/US2024/049107—ISA/EPO—Dec. 19, 2024.
Shrestha A., "Basics of Camera Setup in Blender", WayBack Machine Internet Archive, May 23, 2022, pp. 1-11, XP093231477, pp. 1-13, section 3 "Camera properties", pp. 6 to 8.
Liu M., et al., "One-2-3-45++: Fast Single Image to 3D Objects with Consistent Multi-View Generation and 3D Diffusion", arXiv:2311.07885v1, Nov. 14, 2023, pp. 1-12.
International Search Report and Written Opinion—PCT/US2024/049107—ISA/EPO—Feb. 10, 2025.

* cited by examiner

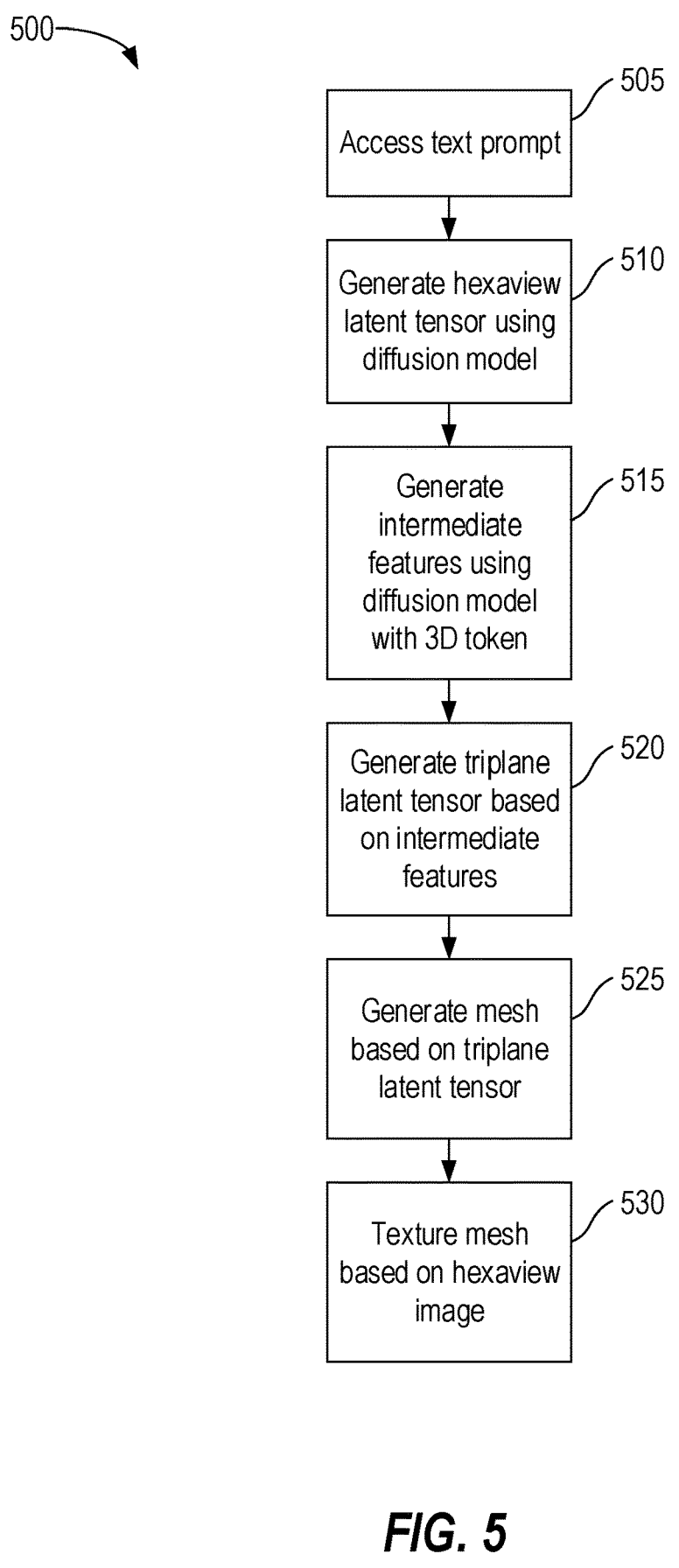

500

505 Access text prompt

510 Generate hexaview latent tensor using diffusion model

515 Generate intermediate features using diffusion model with 3D token

520 Generate triplane latent tensor based on intermediate features

525 Generate mesh based on triplane latent tensor

530 Texture mesh based on hexaview image

*FIG. 5*

TEXT-TO-IMAGE DIFFUSION MODELS FOR GENERALIZABLE MESH GENERATION

INTRODUCTION

Aspects of the present disclosure relate to machine learning.

A wide variety of machine learning models have been trained for a similarly vast assortment of tasks in recent years. For example, generative models (e.g., generative adversarial networks (GANs), diffusion models, and the like) have been trained to generate new output data (e.g., images or text) based on input prompts. For example, some models are able to receive a text string describing an object (e.g., "a sailboat"), and use this string to generate a two-dimensional image that depicts the requested object (e.g., an image of a sailboat).

BRIEF SUMMARY

Certain aspects of the present disclosure provide a processor-implemented method, comprising: generating a multiview latent tensor based on processing a textual input using a diffusion machine learning model, wherein the multiview latent tensor corresponds to a plurality of orthographic projections corresponding to the textual input; generating a triplane latent tensor based on the multiview latent tensor using a conversion machine learning model; and generating a three-dimensional mesh based on processing the triplane latent tensor using a decoder machine learning model.

Other aspects provide processing systems configured to perform the aforementioned methods as well as those described herein; non-transitory, computer-readable media comprising instructions that, when executed by one or more processors of a processing system, cause the processing system to perform the aforementioned methods as well as those described herein; a computer program product embodied on a computer-readable storage medium comprising code for performing the aforementioned methods as well as those further described herein; and a processing system comprising means for performing the aforementioned methods as well as those further described herein.

The following description and the related drawings set forth in detail certain illustrative features of one or more aspects.

BRIEF DESCRIPTION OF THE DRAWINGS

The appended figures depict certain aspects of the present disclosure and are therefore not to be considered limiting of the scope of this disclosure.

FIG. 5 is a flow diagram depicting an example method for generating and texturing three-dimensional meshes using multiview image data, according to some aspects of the present disclosure.

To facilitate understanding, identical reference numerals have been used, where possible, to designate identical elements that are common to the drawings. It is contemplated that elements and features of one aspect may be beneficially incorporated in other aspects without further recitation.

DETAILED DESCRIPTION

Figure 1:
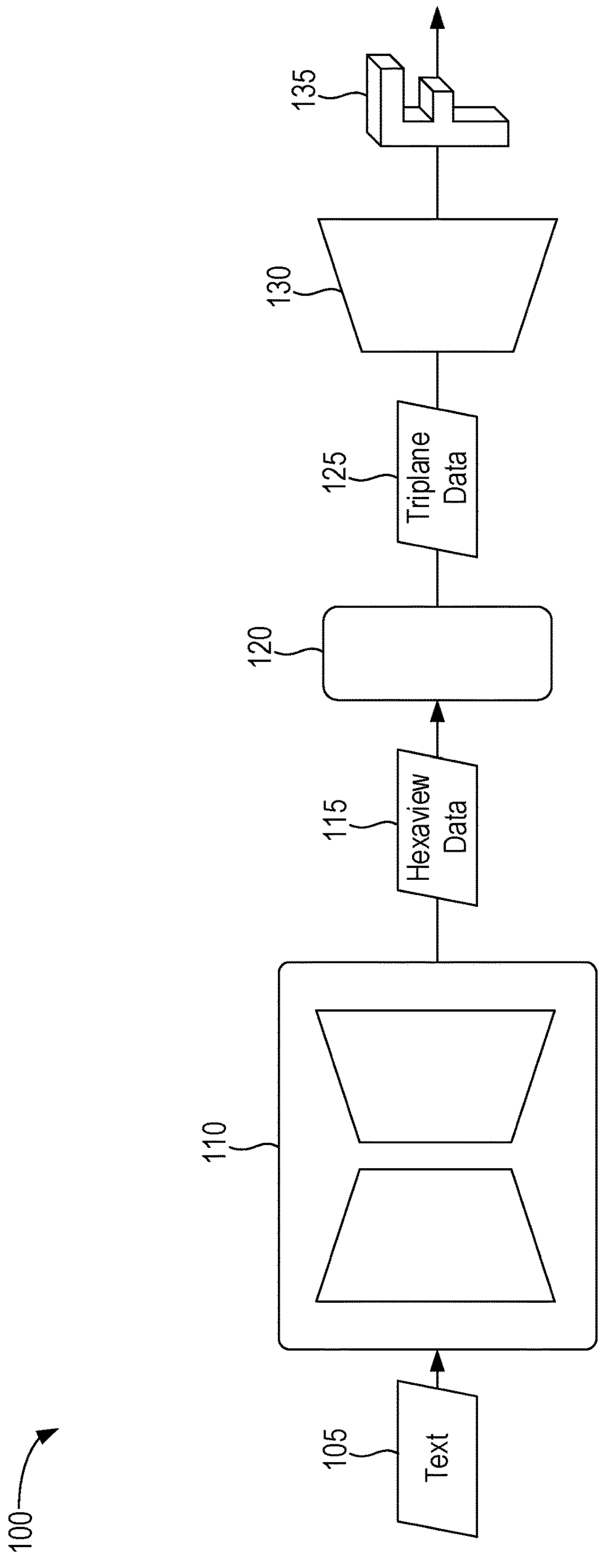
FIG. 1 depicts an example workflow for generating three-dimensional meshes using generative machine learning models, according to some aspects of the present disclosure.

Aspects of the present disclosure provide apparatuses, methods, processing systems, and non-transitory computer-readable mediums for providing improved machine learning. Specifically, aspects relate to improved three-dimensional (3D) mesh generation.

Despite the recent advances in two-dimensional (2D) generative modeling (e.g., to generate images), efficient generation of high-quality 3D assets remains a difficult task. One notable challenge for 3D mesh generation lies in data scarcity: training effective models relies on massive amounts of training data. The most extensive 3D training datasets available encompass millions of assets, while 2D training datasets often contain billions of images. As a result, some conventional approaches fail to adequately train generalizable 3D mesh generation models.

In some aspects of the present disclosure, large and pretrained 2D diffusion models may be leveraged and adapted to generate 3D meshes. More specifically, a pretrained text-to-image generative model (e.g., a diffusion model that generates images based on textual input) may be fine-tuned or refined such that the model jointly predicts or generates multiple orthographic projections of a requested object (e.g., an object described in text input). In some aspects, this set of orthographic projections is referred to as a "multiview" image to denote that the image data contains multiple orthographic projections of an object. In some aspects, the multiview image may be referred to as a "hexaview" image to indicate that the image contains six orthographic projections.

In some aspects, these projections are orthographic (e.g., each is a parallel projection of the object(s) where the projection lines are orthogonal to the projection plane, such that the view of the object(s) do not include perspective). In some aspects, one or more of the multiple view are also orthogonal (e.g., perpendicular) to each other. For example, in the case of a triview (with three orthographic projections), the views may include a top view (e.g., a parallel projection of the object as viewed from the above), a side view (e.g., a parallel projection of the object as viewed from one side), and a front view (e.g., a parallel projection of the objet as viewed from directly in front). In some aspects, in the case of a hexaview image, the views may include a top view, a bottom view, a left view, a right view, a front view, and a back view.

In some aspects, the multiview image data can be processed using a conversion machine learning model to generate a corresponding triplanar latent, and the triplane latent can be processed to generate a 3D mesh. In some aspects, the disclosed techniques and architectures do not rely on per-sample optimization and can generate high-quality and diverse objects from textual prompts in seconds, which is significantly faster than existing approaches. Furthermore, the disclosed architectures demonstrate strong generalization to new objects or compositions.

In some aspects of the present disclosure, machine learning models can be leveraged to generate 3D meshes for a wide variety of domains and use cases. For example, such 3D mesh generation may be useful for video game development (e.g., to generate meshes that may be used as objects in the game), for augmented reality (AR) and/or virtual reality (VR) (e.g., to generate objects displayed using AR/VR), for graphic design tasks, to generate assets for movies and shows, and the like. 3D mesh generation is a notably laborious and time-consuming task using some conventional methods. However, using aspects of the present disclosure, highly detailed and textured meshes can be generated by processing text-based prompts using specially trained machine learning models.

Example Workflow for Generating Three-Dimensional Meshes Using Generative Machine Learning Models FIG. 1 depicts an example workflow 100 for generating three-dimensional meshes using generative machine learning models, according to some aspects of the present disclosure. In some aspects, the workflow 100 is performed by a machine learning system (e.g., a computing system that trains machine learning models and/or uses trained machine learning models). In some aspects, the model(s) may be trained on one or more computing systems (referred to in some aspects as "training systems") and then deployed for inferencing (e.g., mesh generation) on one or more other computing systems (referred to in some aspects as "inferencing systems").

In the illustrated workflow 100, a text input 105 is accessed for processing using a diffusion model 110 (referred to in some aspects as a diffusion machine learning model) to generate hexaview data 115 (or more generically, multiview data). As used herein, "accessing" data may generally refer to receiving, requesting, retrieving, collecting, measuring, generating, obtaining, or otherwise gaining access to the data. In the illustrated example, the text input 105 generally comprises natural language text describing a desired object or scene. For example, the text input 105 may specify an object such as "a green dragon holding a sword" or "a blue humanoid robot with four arms." In some aspects, the text input 105 is provided by a user. In some aspects, the text input 105 may be generated using other operations, such as by processing audio data using a voice-to-text algorithm. Although not included in the depicted example, in some aspects, other input data may be used in addition to or instead of the text input 105 to prompt the model (e.g., image data depicting the desired objects).

In some aspects, the diffusion model 110 uses an autoencoder architecture (e.g., a variational autoencoder (VAE) model). For example, the diffusion model 110 may use an encoder portion to encode input (e.g., the text input 105) to a latent space, and a decoder portion to decode the latent data to a desired output (e.g., hexaview data 115). In some aspects, the diffusion model 110 is a modified or updated version of a pre-trained text-to-image model. For example, a generative model that has been trained to generate images based on text strings (e.g., using large amounts of image data) may be trained or accessed by the machine learning system, and may then be refined, fine-tuned, adapted, modified, or otherwise updated based on a relatively small set of 3D data to impart 3D knowledge into the architecture, as discussed in more detail below.

In the illustrated workflow 100, the diffusion model 110 generates the hexaview data 115. Although depicted as a hexaview for conceptual clarity, in some aspects, the hexaview data 115 may be any multiview data (e.g., triview, quadview, and the like). Generally, the hexaview data 115 corresponds to any data comprising or representing a plurality of orthographic projections depicting the object(s) described by or indicated in the text input 105. For example, the hexaview data 115 may be an image having six orthographic projections of the object(s) spatially concatenated (e.g., into two rows of three projections each).

In some aspects, the hexaview data 115 comprises data for a "front" view (e.g., a parallel projection from the front of the object), a "back" view (e.g., a parallel projection from the back of the object), a "left" view (e.g., a parallel projection from the left side of the object), a "right" view (e.g., a parallel projection from the right side of the object), a "top" view (e.g., a parallel projection from the top of the object), and a "bottom" view (e.g., a parallel projection from the bottom of the object). In some aspects, the hexaview data 115 has three pairs of corresponding or parallel orthographic projections. That is, the "top" and "bottom" view may be referred to as a "parallel pair" or a "pair of parallel orthographic projections" to indicate that the two views are generated using projection lines that are parallel to each other (as compared to, for example, the "left" view, the "right" view, the "front" view, and the "back" view, which each use projection lines that are orthogonal or perpendicular to the "top" and "bottom" views). Similarly, the "left" and "right" views may be referred to as a parallel pair, and the "front" and "back" views may be referred to as a parallel pair.

In some aspects, as discussed in more detail below, the hexaview data 115 is image data. For example, the hexaview data 115 may be an image (e.g., six orthographic projections spatially concatenated together) having four channels (e.g., where each pixel has four values, such as a red value, a green value, a blue value, and an alpha value to define opacity of the pixel). In some aspects, the hexaview data 115 is instead a set of intermediate features generated by an internal layer (e.g., the penultimate layer) of the diffusion model 110. For example, the diffusion model 110 may be trained to generate hexaview images data, but rather than using such image data to generate the 3D mesh, the hexaview data 115 may be an intermediate feature tensor (e.g., having hundreds of channels) generated by the penultimate layer. In some aspects, the intermediate features may be processed using the final layer(s) of the diffusion model 110 to generate a hexaview image (as discussed below).

In some aspects, as discussed in more detail below, the hexaview data 115 is generated by processing data using multiple iterations of the diffusion model 110. For example, the diffusion model 110 may comprise a denoising backbone that processes random (e.g., Gaussian) noise, along with the text input 105, to generate a relatively denoised latent tensor. This denoised tensor can then be iteratively processed using the backbone to generate progressively less noisy data, until a final iteration results in a latent tensor that can be decoded to generate a high quality hexaview image. In some aspects, rather than using this final latent, the diffusion model 110 may perform one additional iteration with an added conditioning token used to impart 3D knowledge into the latents. The features of the penultimate layer of the model may then be used as the hexaview data 115, as discussed in more detail below.

In the illustrated workflow 100, the hexaview data 115 is processed by a conversion module 120 (referred to in some aspects as a conversion machine learning model) to generate triplane data 125. In some aspects, the conversion module 120 may comprise one or more non-parameterized operations (e.g., to spatially slice the hexaview data 115, rotate and/or flip the slices, and concatenate slices corresponding to parallel views, as discussed below in more detail). The pre-processed data may then be processed using one or more parameterized components (e.g., one or more convolution layers) to generate the triplane data 125.

In some aspects, the triplane data 125 (also referred to in some aspects as a triplane latent tensor) is a triplane representation of the 3D objects (e.g., using three axis-aligned feature planes). The triplane data 125 may be volumetrically rendered or projected to create a 3D mesh, in some aspects.

In the illustrated example, the triplane data 125 is processed by a decoder model 130 (referred to in some aspects as a decoder machine learning model) to generate an output 3D mesh 135. In the illustrated example, the mesh 135 is a three-dimensional uppercase "F." For example, the text input 105 may have included "an uppercase F."

In some aspects, the decoder model 130 may correspond to or be part of a pre-trained auto-encoder model. For example, as discussed in more detail below, a VAE-based model may be trained to generate 3D meshes based on input data (e.g., input point clouds) where the latent space (between the encoder and decoder) corresponds to a triplane representation of the input. After this mesh generation model is trained, the encoder and decoder portions may be used to facilitate fine-tuning of the diffusion model 110, as discussed in more detail below. Further, the decoder portion of the mesh generation model may be used as the decoder model 130 during inferencing (e.g., to generate 3D meshes during runtime).

In some aspects, the mesh 135 may generally be any format and type of mesh, depending on the particular implementation. For example, in some aspects, the mesh 135 is a surface mesh (e.g., a set of polygonal faces, such as triangles, quadrilaterals, and the like). As another example, in some aspects, the mesh 135 may be a solid mesh or volume mesh (e.g., a set of three-dimensional elements, such as tetrahedrons, hexahedrons, polyhedrons, and the like).

In some aspects, as discussed below in more detail, the mesh 135 may be textured. For example, in some aspects, the triplane data 125 itself encodes texture information from the hexaview data 115 (e.g., generated by the diffusion model 110). In some aspects, therefore, the mesh 135 may already include texture material. In some aspects, as discussed below, the hexaview data 115 may additionally be directly used to add further detail to the texture of the mesh 135. For example, in some aspects, a UV mapping may be generated by using a UV unwrapping algorithm to process the initial mesh 135. UV Mapping generally involves projecting a three-dimensional mesh to a two-dimensional plane to facilitate texturing or coloring the mesh using a two-dimensional image. Generally, the letters "U" and "V" are used by convention to denote the axes of the two-dimensional image. In some aspects, rather than using UV mapping, the machine learning system may use a UVW mapping approach, which enables use of a third dimension in the textures (via the "W" axis). A UV texture may be initialized based on the original colors predicted from the triplane data 125 and the UV mapping. In some aspects, the hexaview data 115 may be processed using one or more final layers of the diffusion model 110 (e.g., using the pre-trained decoder) to generate a hexaview image. The pixel values from the hexaview image (e.g., red, green, blue, and alpha (RGBA)) may be mapped onto the initialized UV texture. This refined texture can then be used to texture the mesh 135 based on the UV mapping, resulting in substantially improved detail.

Additionally, in some aspects, additional texture information may be encoded into the triplane data 125 and/or hexaview data 115. In some aspects, the additional textures may correspond to different texture modalities. For example, one set of hexaview data 115 may be generated to yield texture including the diffuse or base color of the object, a second set of hexaview data 115 may be generated to yield a texture including the surface normal of the object, a third set of hexaview data 115 may be generated to yield a texture including the metallic properties, roughness property. Generally, a set of hexaview data 115 may be generated for any texture modality or material property of the object. By using such additional information, the resulting mesh 135 texturing can be substantially improved.

As discussed above, the mesh 135 may be used for a wide variety of uses. For example, the mesh 135 may be directly used as a 3D asset in a video game, a movie, a show, and the like. In some aspects, the mesh 135 may be used as an initial or starting mesh, allowing a user to rapidly refine the starting mesh to generate a final mesh. In some aspects, the machine learning system (or another system) may render one or more images depicting the mesh 135 from one or more perspectives or angles, and output the rendered image(s) via one or more displays. This may allow users to readily visually observe, evaluate, and/or modify the mesh 135.

Figure 2:
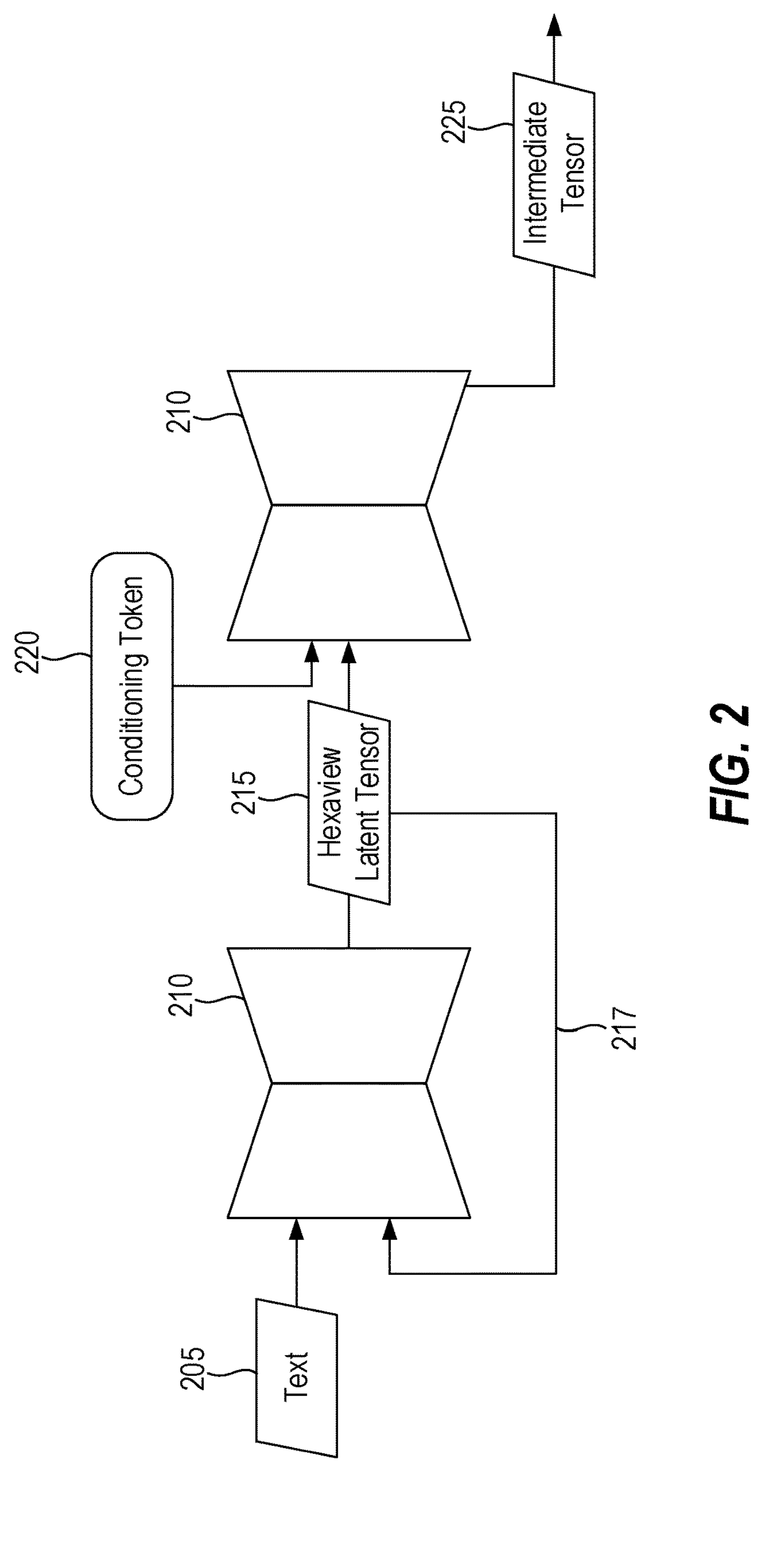
FIG. 2 depicts an example workflow for generating multiview image latent tensors using a diffusion model to facilitate three-dimensional mesh generation, according to some aspects of the present disclosure.

Example Workflow for Generating Multiview Image Latent Tensors Using a Diffusion Model to Facilitate Three-Dimensional Mesh Generation FIG. 2 depicts an example workflow 200 for generating multiview image latent tensors using a diffusion model to facilitate three-dimensional mesh generation, according to some aspects of the present disclosure. In some aspects, the workflow 200 is performed by a machine learning system, such as the machine learning system discussed above with reference to FIG. 1. In some aspects, the workflow 200 provides additional detail for the operations of the diffusion model 110 of FIG. 1.

In the illustrated workflow, text input 205 (which may correspond to the text input 105 of FIG. 1) is processed to generate an intermediate tensor 225 (which may correspond to the hexaview data 115 of FIG. 1). Specifically, as illustrated, the text input 205 is processed using a diffusion model 210 (which may correspond to the diffusion model 110 of FIG. 1) to generate a hexaview latent tensor 215. In some aspects, as discussed above and illustrated by the arrow 217, the diffusion model 210 may be used to iteratively process data during multiple iterations in order to progressively denoise the hexaview latent tensor 215.

For example, in some aspects, the first iteration of processing data may include processing a noisy latent tensor (e.g., having random Gaussian noise), in conjunction with the text input 205 (or an encoded version thereof) to generate a first hexaview latent tensor 215 for the first iteration. As indicated by the arrow 217, the hexaview latent tensor 215 may then be used as the input latent (along with the text encoding(s)) during a second iteration to generate a new hexaview latent tensor 215. This process may repeat for any number of iterations until the hexaview latent tensor 215 is generated during the last iteration. As illustrated, the text input 205 (e.g., an embedding generated based on the text) is used to condition the denoising process. Although not depicted in the illustrated example, in some aspects, additional data may be used to condition the denoising. For example, in some aspects, the denoising may be further conditioned based on timestep embeddings (e.g., indicating which iteration is being performed), positional embeddings, and the like.

In the illustrated example, the hexaview latent tensor 215 is processed for one additional or final iteration using the diffusion model 210. During this final iteration, an additional conditioning token 220 may be used to condition the model. For example, in some aspects, the conditioning token 220 may correspond to a "make-it-3D" token that 3D-conditions the diffusion model 210 to ensure that the final output adequately incorporates the relevant 3D characteristics. As illustrated, rather than using a final hexaview latent tensor as the output (e.g., as the hexaview data 115 of FIG. 1), the machine learning system uses an intermediate tensor 225 (e.g., the features generated by the penultimate layer of the diffusion model 210) as the output representation. As discussed above, these intermediate tensor 225 may be used to generate a triplane representation of the object(s).

Although the illustrated example depicts generating the intermediate tensor 225 using the same diffusion model 210 that is used to generate the hexaview latent tensors 215, in some aspects, other components may be used. For example, in some aspects, the diffusion model 210 may be used to generate the hexaview latent tensor 215 over multiple iterations. Once the iterations are complete, the final hexaview latent tensor 215 may be processed using a different machine learning model (e.g., including one or more convolution operations) to generate the intermediate tensor 225.

Example Workflow for Generating Triplane Data Based on Multiview Image Data

Figure 3:
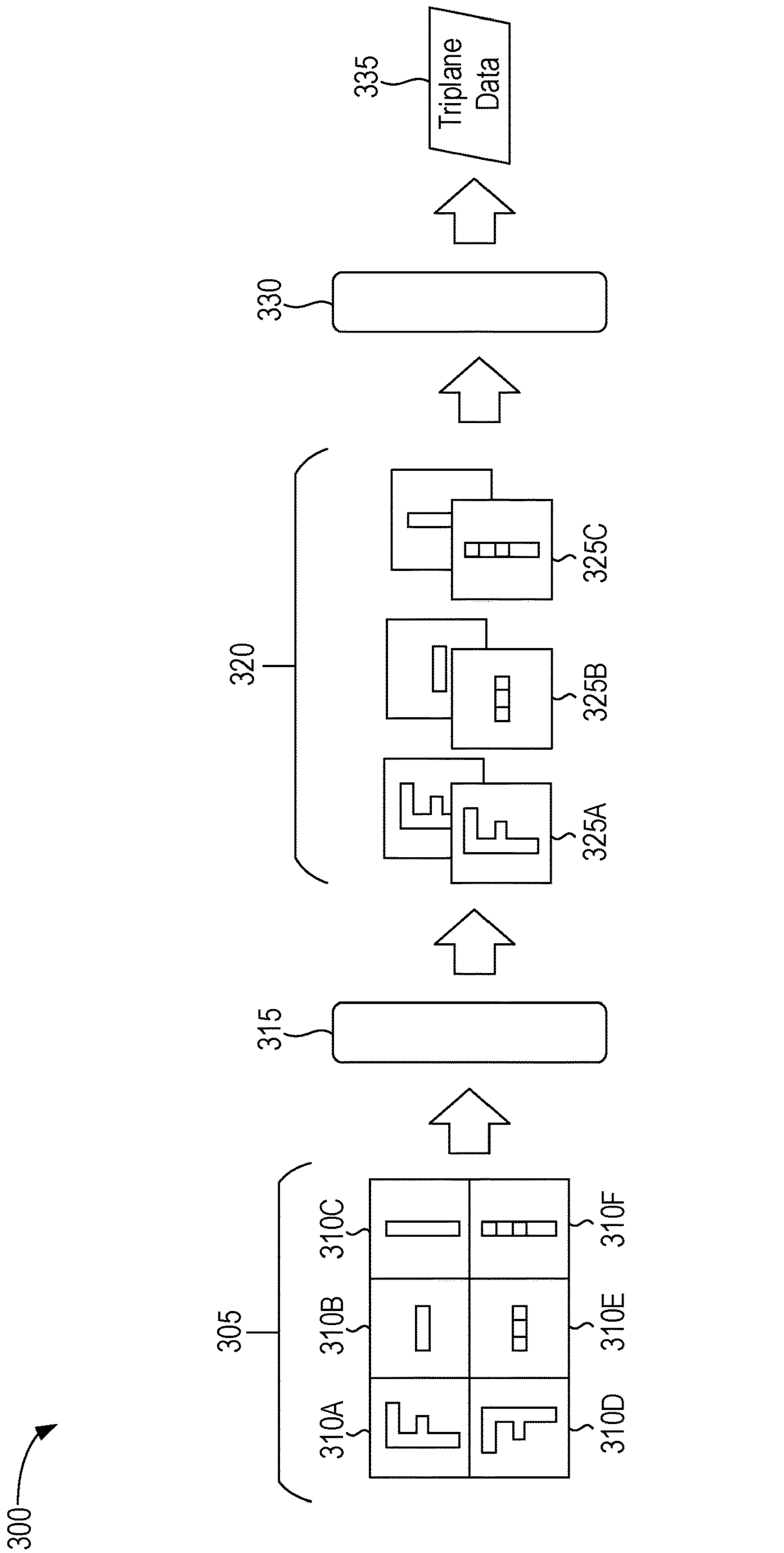
FIG. 3 depicts an example workflow for generating triplane data based on multiview image data, according to some aspects of the present disclosure.

FIG. 3 depicts an example workflow 300 for generating triplane data based on multiview image data, according to some aspects of the present disclosure. In some aspects, the workflow 300 is performed by a machine learning system, such as the machine learning system discussed above with reference to FIGS. 1-2. In some aspects, the workflow 300 provides additional detail for the operations of the conversion module 120 of FIG. 1.

In the illustrated workflow 300, hexaview data 305 (which may correspond to the hexaview data 115 of FIG. 1 and/or the intermediate tensor 225 of FIG. 2) is processed to generate triplane data 335 (which may correspond to the triplane data 125 of FIG. 1). In the illustrated example, the hexaview data 305 comprises or corresponds to a plurality of orthographic projections 310A-F. Specifically, as illustrated, the hexaview data 305 depicts a capital letter "F" (e.g., the hexaview data 305 may have been generated based on text such as "capital F") and includes a front view orthographic projection 310A, a back view orthographic projection 310D, a top view orthographic projection 310B, a bottom view orthographic projection 310E, a left view orthographic projection 310C, and a right view orthographic projection 310F. As illustrated, each orthographic projection 310 is spatially concatenated to form the hexaview data 305.

In the illustrated example, the hexaview data 305 is depicted as image data for conceptual clarity and visualization. However, as discussed above, the hexaview data 305 may be a latent tensor (e.g., the hexaview latent tensor 215 of FIG. 2) and/or an intermediate feature tensor (e.g., the intermediate tensor 225 of FIG. 2). As discussed above, such latent tensors and/or intermediate features may still comprise or correspond to the six (or other number of) orthographic views or projections. For example, the front view orthographic projection 310A may comprise latent and/or feature data for an orthographic projection of the letter "F" from the front. In some aspects, the hexaview data 305 is represented as a tensor having dimensionality $2H \times 3W \times C1$, where H is the height (in pixels) of each orthographic projection 310, W is the width (in pixels) of each orthographic projection 310, and C1 is the channel depth of the hexaview data 305.

As illustrated, the hexaview data 305 is processed using a transformation operation 315 to generate concatenated data 320. The transformation operation 315 generally corresponds to one or more non-parameterized transformations or operations used to align parallel views of the hexaview data 305 in order to match orientations of the projections. As discussed above, in some aspects, each orthographic projection 310 in the hexaview data 305 may have a corresponding or parallel orthographic projection 310, where the parallel view corresponds to a projection from the opposite side of the object(s). For example, the front view orthographic projection 310A and back view orthographic projection 310D may form a first parallel pair, the top view orthographic projection 310B and bottom view orthographic projection 310E may be a second parallel pair, and the left view orthographic projection 310C and right view orthographic projection 310F may be a third parallel pair.

In the illustrated workflow 300, the transformation operation 315 generally includes slicing the hexaview data 305 to separate the orthographic projections 310 (e.g., into six separate tensors). The transformation operation 315 may then include flipping (also referred to in some aspects as mirroring) and/or rotating one or more of the sliced orthographic projections 310 to align each orthographic projection 310 with its parallel view (e.g., mirroring the back orthographic projection 310D horizontally so that the features of the back orthographic projection 310D align with the features of the front orthographic projection 310A). In the illustrated example, the transformation operation 315 further includes concatenating the parallel or corresponding views in the channel dimension.

Specifically, as illustrated, the realigned front and back view orthographic projections 310A and 310D are concatenated to form a concatenated orthographic projection 325A. Further, the realigned top and bottom view orthographic projections 310B and 310E are concatenated to form a concatenated orthographic projection 325B, and the realigned left and right view orthographic projections 310C and 310F are concatenated to form a concatenated orthographic projection 325C. In some aspects, the concatenated data 320 is represented as a tensor having dimensionality $H \times 3W \times 2C1$.

In the illustrated workflow 300, the concatenated data 320 is then processed using a conversion model 330 to generate a set of triplane data 335. In some aspects, the conversion model 330 (also referred to in some aspects as a conversion machine learning model) generally includes one or more parameterized operations (e.g., convolutions using learned weights, having values learned during training).

Figure 4:
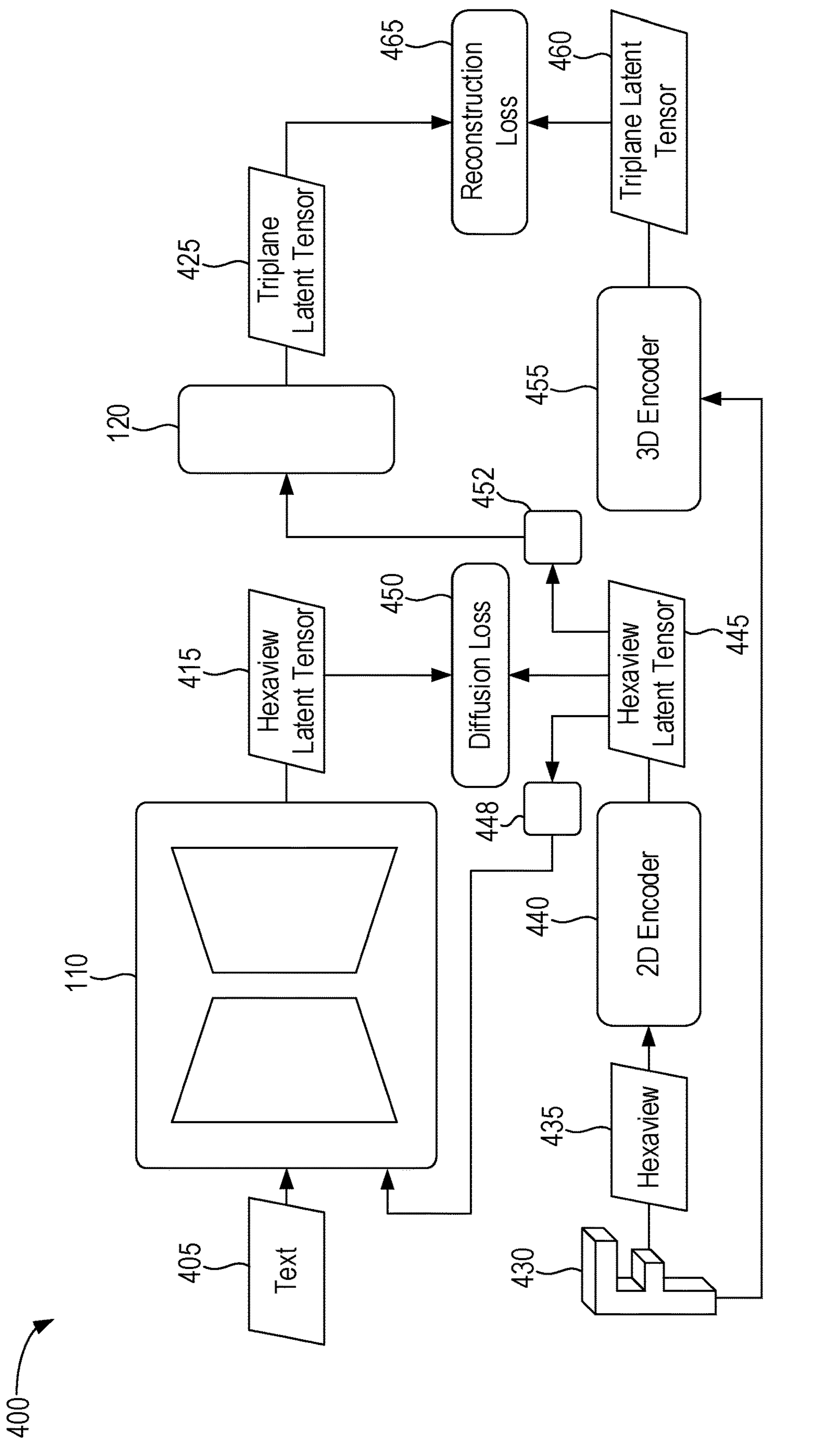
FIG. 4 depicts an example workflow for training machine learning models to generate three-dimensional meshes, according to some aspects of the present disclosure.

Example Workflow for Training Machine Learning Models to Generate Three-Dimensional Meshes FIG. 4 depicts an example workflow 400 for training machine learning models to generate three-dimensional meshes, according to some aspects of the present disclosure. In some aspects, the workflow 400 is performed by a machine learning system, such as the machine learning system discussed above with reference to FIGS. 1-3. In some aspects, the workflow 400 provides additional detail for training the various machine learning components discussed above, such as the diffusion model 110 of FIG. 1 and/or the conversion module 120 of FIG. 1 (e.g., the conversion model 330 of FIG. 3).

In the depicted workflow 400, a ground-truth or target 3D mesh 430 is evaluated to generate a hexaview 435. That is, a hexaview image (e.g., six orthogonal projections or views) may be generated based on rendering the mesh 430 from each of the six angles (without perspective). In the illustrated example, the hexaview 435 is processed using a 2D encoder 440 to generate a ground-truth hexaview latent tensor 445. In some aspects, the 2D encoder 440 is a machine learning model or component trained (or pre-trained) to generate latent embeddings.

In the illustrated example, a text input 405 (which may comprise natural language text, as discussed above with reference to the text input 105 of FIG. 1 and the text input 205 of FIG. 2) is processed by the diffusion model 110 to generate a hexaview latent tensor 415. In some aspects, as discussed above, the diffusion model 110 may be a pre-trained text-to-image model (e.g., trained based on text and image data), and the machine learning system may use the workflow 400 to refine or update the parameters of the model to yield an improved diffusion model 110 that can produce 3D-aware hexaviews.

In some aspects, as discussed above, generating the hexaview latent tensor 415 may include processing data (such as the text input 405 and an intermediate latent tensor) using the diffusion model 110 for one or more iterations. In some aspects, during the first iteration, a random noise tensor may be provided as input to seed the denoising. In some aspects, a ground-truth hexaview latent (such as the hexaview latent tensor 445) may instead be used.

For example, in the illustrated workflow 400, the ground-truth hexaview latent tensor 445 may be processed using a noise operation 448 to add some amount of noise (e.g., Gaussian noise) to create a noisy ground-truth latent. The noisy ground-truth latent may then be provided as input to the diffusion model 110, along with the embedding of the text input 405, to generate the (denoised) hexaview latent tensor 415. This may facilitate training of the diffusion model 110.

As illustrated, the ground-truth hexaview latent tensor 445 and the generated hexaview latent tensor 415 are used to generate a diffusion loss 450. That is, the diffusion loss 450 may be generated based on the difference between the hexaview latent tensor 445 and the hexaview latent tensor 415. The diffusion loss 450 may generally use a variety of loss formulations, such as mean squared error. In some aspects, the diffusion loss 450 may be used to update one or more parameters of the diffusion model 110 during training.

In the illustrated example, the ground-truth hexaview latent tensor 445 is also processed using an intermediate operation 452 to generate an intermediate feature tensor, which is used as input to the conversion module 120. For example, as discussed above, the intermediate operation 452 may correspond to processing the hexaview latent tensor 445 using the diffusion model 110 for a final single iteration (along with a 3D token), and the features of the penultimate layer of the diffusion model may be used as input to the conversion module 120. In other aspects, as discussed above, the input to the conversion module 120 may be the hexaview latent tensor 445 itself.

As illustrated, the conversion module 120 generates a triplane latent tensor 425 based on the module's input (e.g., based on the hexaview latent tensor 445 directly, or based on intermediate features generated using the hexaview latent tensor 445).

Additionally, in the illustrated example, a 3D encoder 455 is used to generate a ground-truth triplane latent tensor 460 based on the target mesh 430. In some aspects, the 3D encoder 455 may be an encoder from a VAE-based model trained to generate 3D meshes based on input data. For example, a model may be trained to receive a point cloud, and generate (using the 3D encoder 455) a latent space representation (e.g., a triplane representation) of the input. Further, during training, a decoder component may be trained to generate a 3D mesh. This mesh may be compared against a ground-truth mesh in order to train the encoder and decoder components. In some aspects, after this model is trained, the encoder may be used as the 3D encoder 455 to train the diffusion model 110 and/or conversion module 120. Further, as discussed above, the decoder portion of the model may be used during runtime as the decoder model 130 of FIG. 1.

In some aspects, rather than providing the mesh 430 directly to the 3D encoder 455, the mesh 430 may be processed by one or more other operations, such as to generate a point cloud based on the mesh 430. The point cloud may then be used as input to the 3D encoder 455.

In the illustrated example, the generated triplane latent tensor 425 and the ground-truth triplane latent tensor 460 are then used to generate a reconstruction loss 465. That is, the reconstruction loss 465 may be generated based on the difference between the triplane latent tensor 425 and the triplane latent tensor 460. The reconstruction loss 465 may generally use a variety of loss formulations, such as mean squared error. In some aspects, the reconstruction loss 465 may be used to update one or more parameters of the conversion module 120 (e.g., the conversion model 330 of FIG. 3) during training.

In some aspects, the workflow 400 may be performed any number of times using any number of training meshes 430 to generate diffusion loss 450 and reconstruction loss 465 to train the models. In some aspects, the models may be trained using backpropagation to update the weights or other parameters for each layer of each model. In some aspects, the machine learning system may update the parameters based on each training exemplar (e.g., using stochastic gradient descent) and/or based on batches of training exemplars (e.g., using batch gradient descent).

In some aspects, the diffusion model 110 and the conversion module 120 may be trained independently (as illustrated by the workflow 400). That is, the parameters of the diffusion model 110 may be updated based on the mesh 430 without considering the output of the conversion module 120, and the conversion module 120 may be updated based on the mesh 430 without considering the output of the diffusion model 110. In this way, the diffusion model 110 and conversion module 120 may be trained at different times, on different systems, and/or for different lengths of time or numbers of iterations.

In some aspects, the diffusion model 110 and the conversion module 120 may be jointly trained (e.g., end-to-end). For example, rather than using the ground-truth hexaview latent tensor 445 to generate the triplane latent tensor 425, the machine learning system may instead use the generated hexaview latent tensor 415 to generate the triplane latent tensor 425. In some aspects, the diffusion model 110 may be trained by performing a single denoising iteration at a time. That is, a first diffusion loss may be generated based on processing a first version of the noisy ground-truth hexaview latent (e.g., the hexaview latent tensor 445 having a first amount of added noise) as input to generate corresponding denoised output. A second diffusion loss may also be generated based on processing a second versions of the noisy ground-truth hexaview latent (e.g., the hexaview latent tensor 445 having a second, different amount of added noise) as input to generate corresponding denoised output.

Therefore, if an end-to-end joint training operation is used, the conversion module 120 may be trained to predict triplane latent tensors 425 based on "partially denoised" hexaview latent tensors 415. In some aspects, this may act as a regularization technique which pushes the conversion module 120 to be robust to noisy inputs.

In some aspects, after training, the diffusion model 110 and conversion module 120 (along with the decoder model discussed above) may be deployed for inferencing. Generally, deploying the models may include any operations used to prepare or provide the models for inferencing (by the machine learning system, or by another system).

Example Method for Generating and Texturing Three-Dimensional Meshes Using Multiview Image Data FIG. 5 is a flow diagram depicting an example method 500 for generating and texturing three-dimensional meshes using multiview image data, according to some aspects of the present disclosure. In some aspects, the method 500 is performed by a machine learning system, such as the machine learning system discussed above with reference to FIGS. 1-4. In some aspects, the method 500 is performed by a dedicated inferencing system.

At block 505, the machine learning system accesses a text prompt (e.g., the text input 105 of FIG. 1 and/or the text input 205 of FIG. 2). For example, as discussed above, the text prompt may include natural language text describing one or more objects, scenes, environments, or other entities for which a 3D mesh is desired.

At block 510, the machine learning system generates a hexaview latent tensor using a diffusion machine learning model (e.g., the diffusion model 110 of FIG. 1 and/or FIG. 4, and/or the diffusion model 210 of FIG. 2). For example, as discussed above, the machine learning system may process data using the diffusion model over a plurality of iterations to iteratively denoise the hexaview latent tensor. Although the illustrated example depicts a hexaview latent tensor for conceptual clarity, as discussed above, the machine learning system may alternatively generate any multiview latent tensor.

In some aspects, rather than generating a single hexaview latent tensor, the machine learning system may additionally generate one or more auxiliary hexaview latent tensors. For example, in some aspects, each of the auxiliary hexaview latent tensors may correspond to a rotated version of the original hexaview latent tensor (e.g., depicting six orthographic projections of the object at different angles, such as on diagonally from the front-left, front-right, and so on, as compared to the front, back, left, right, top, and bottom views of the original latent). In some aspects, using such auxiliary hexaview latent tensor(s) may help the models to generate higher quality 3D meshes. That is, the triplane latents and/or final mesh may be generated based on both the hexaview latent tensor, as well as the auxiliary hexaview latent tensor(s).

As another example, in some aspects, each of the auxiliary hexaview latent tensors may correspond to a different resolution (e.g., initially generating a hexaview latent tensor at a relatively low resolution, and progressively increasing the resolution across diffusion iterations). In some aspects, using such auxiliary hexaview latent tensor(s) may help improve model robustness and/or reduce the computational load of processing data using the diffusion model. That is, the triplane latents and/or final mesh may be generated based on both the hexaview latent tensor, as well as the auxiliary hexaview latent tensor(s).

As another example, in some aspects, each of the auxiliary hexaview latent tensors may correspond to a different material property (e.g., a first latent for a diffuse or base color, a second latent for a metallic feature, a third latent for a surface normal feature, and the like). In some aspects, using such auxiliary hexaview latent tensor(s) may improve the texturing of the output mesh. That is, the texture of the final mesh may be generated based on both the hexaview latent tensor, as well as the auxiliary hexaview latent tensor(s).

At block 515, the machine learning system generates a set of intermediate features (e.g., the intermediate tensor 225 of FIG. 2) using the diffusion model with a 3D token (e.g., the conditioning token 220 of FIG. 2). For example, as discussed above, the hexaview latent tensor (generated during block 510) may be processed for one single or final iteration of the diffusion model, along with a special token indicating to embed 3D features into the output. The features generated by the penultimate layer of the model may then be used as the intermediate features generated during block 515.

At block 520, the machine learning system generates a triplane latent tensor (e.g., the triplane data 125 of FIG. 1 and/or the triplane data 335 of FIG. 3) based on processing the intermediate features using a conversion module (e.g., the conversion module 120 of FIG. 1). For example, as discussed above, the machine learning system may slice, flip, rotate, and/or concatenate the individual orthographic projections (e.g., using the transformation operation 315 of FIG. 3) to yield a concatenated tensor (e.g., the concatenated data 320 of FIG. 3). This concatenated tensor may then be processed using a conversion model (e.g., the conversion model 330 of FIG. 3), which may be a small convolutional neural network.

At block 525, the machine learning system generates a mesh (e.g., the mesh 135 of FIG. 1) based on the triplane latent tensor. For example, as discussed above, the machine learning system may process the triplane latent tensor using a decoder model (e.g., the decoder model 130 of FIG. 1).

At block 530, the machine learning system optionally textures the mesh based at least in part on a hexaview image (generated based on the hexaview latent tensor generated at block 510). For example, as discussed above, a UV texture baking approach that leverages the orthographic views predicted during hexaview diffusion process may be leveraged. In some aspects, these views may contain fine textural details that are missing in the decoded mesh. Therefore, in some aspects, a post-processing procedure may be used to "bake" the intermediate hexaviews onto the decoded mesh. In some aspects, this texturing procedure includes three processes.

First, UV mapping is performed. In some aspects, the machine learning system employs an automatic UV unwrapping algorithm to create a UV mapping, which can be used to project a 2D texture onto the 3D mesh. Next, texture initialization is performed. In some aspects, the machine learning system then initializes the UV texture, such as by mapping each texel in the texture to its corresponding 3D coordinate, sampling the corresponding triplanar feature at that point, and converting the triplanar feature to RGB using a machine learning model (e.g., a multilayer perception (MLP) in the decoder used to create the mesh based on the triplane). Third, the machine learning system may perform hexaview baking. During this process, the machine learning system may project pixels from the (decoded) orthographic views (e.g., from a hexaview image generated based on the hexaview latent) onto the UV texture. In some aspects, where multiple hexaview pixels correspond to the same texel, the machine learning system may average the pixel values. In some aspects, this texture baking process can significantly enhance the visual quality of the mesh.

In these ways, using the method 500, the machine learning system can rapidly and efficiently generate high quality three-dimensional meshes with high-quality visual textures based only on simple textual input. These meshes may be used for a wide variety of purposes and goals, as discussed above.

Example Method for Generating Three-Dimensional Meshes

Figure 6:
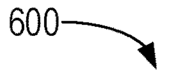
FIG. 6 is a flow diagram depicting an example method for generating three-dimensional meshes, according to some aspects of the present disclosure.
Figure 6:
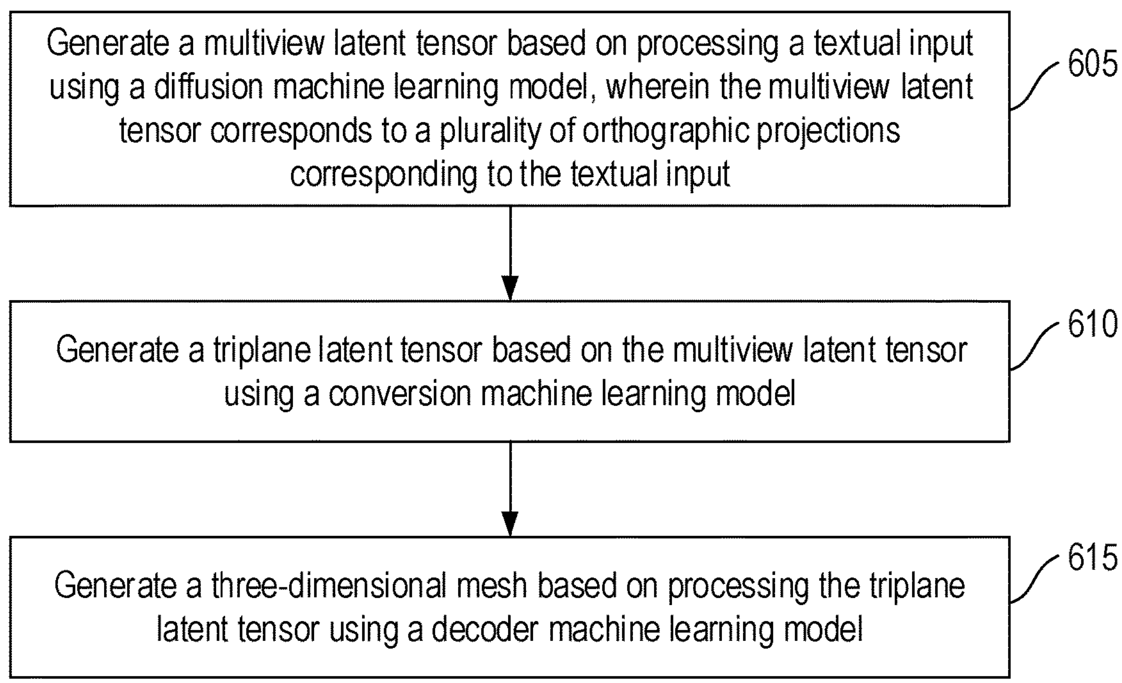

FIG. 6 is a flow diagram depicting an example method 600 for generating three-dimensional meshes, according to some aspects of the present disclosure. In some aspects, the method 600 is performed by a machine learning system, such as the machine learning system discussed above with reference to FIGS. 1-5.

At block 605, a multiview latent tensor is generated based on processing a textual input using a diffusion machine learning model, wherein the multiview latent tensor corresponds to a plurality of orthographic projections corresponding to the textual input;

In some aspects, the textual input specifies an object, and the plurality of orthographic projections correspond to six orthogonal views of the object.

At block 610, a triplane latent tensor is generated based on the multiview latent tensor using a conversion machine learning model; and In some aspects, generating the triplane tensor comprises processing the multiview latent tensor, along with a three-dimensional conditioning token, using the diffusion machine learning model to generate an intermediate tensor.

In some aspects, generating the multiview latent tensor comprises performing a plurality of iterations of processing data without the three-dimensional condition token using the diffusion machine learning model, and generating the intermediate tensor comprises performing a single iteration of processing data using the diffusion machine learning model.

In some aspects, generating the triplane latent tensor comprises, for each respective pair of parallel orthographic projections, from the plurality of orthographic projections, the respective pair corresponding to opposite views of an object specified in the textual input: realigning at least one orthographic projection of the respective pair of parallel orthographic projections to match orientations, and concatenating the realigned respective pair of parallel orthographic projections, as well as processing the concatenated orthographic projections using the conversion machine learning model.

At block 615, a three-dimensional mesh is generated based on processing the triplane latent tensor using a decoder machine learning model.

In some aspects, the method 600 further includes generating a multiview image based on the multiview latent tensor, generating a two-dimensional texture based on the multiview image, and texturing the three-dimensional mesh based on the two-dimensional texture.

In some aspects, generating the two-dimensional texture comprises: generating a UV mapping based on the three-dimensional mesh, initializing the two-dimensional texture based on mapping each texel in the two-dimensional texture to a corresponding point on the three-dimensional mesh, based on the UV mapping, and projecting the multiview image into the initialized two-dimensional texture.

In some aspects, the method 600 further includes generating a plurality of textures using the diffusion machine learning model, each of the plurality of textures corresponding to a respective texture modality, and texturing the three-dimensional mesh based further on the plurality of textures.

In some aspects, the method 600 further includes generating an auxiliary multiview latent tensor using the diffusion machine learning model, and generating the triplane latent tensor based on both the multiview latent tensor and the auxiliary multiview latent tensor.

In some aspects, the auxiliary multiview latent tensor is a relatively lower resolution, as compared to the multiview latent tensor.

In some aspects, the method 600 further includes rendering an image depicting the three-dimensional mesh, and outputting the rendered image via a display.

Example Processing System for Machine Learning

Figure 7:
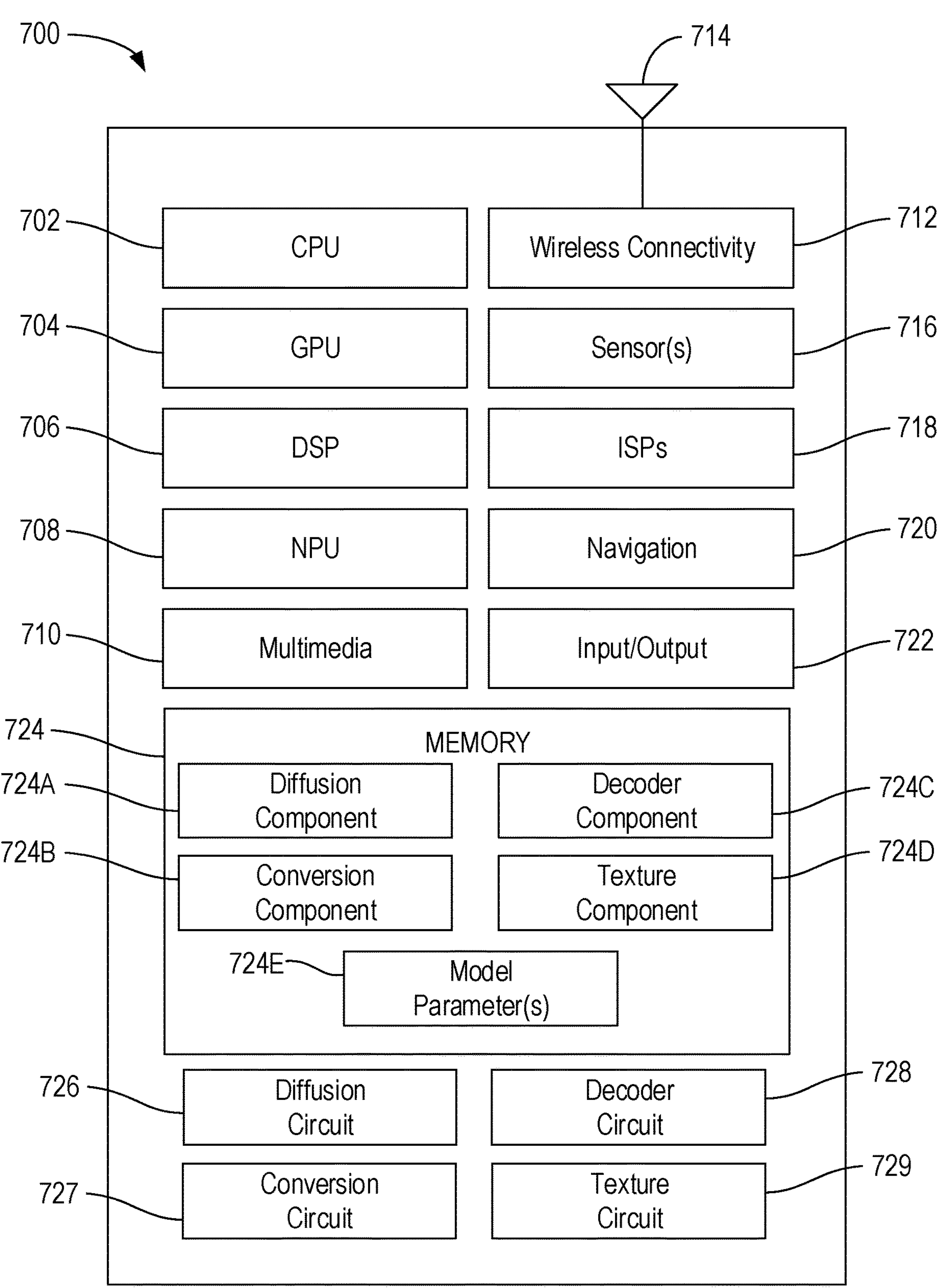
FIG. 7 depicts an example processing system configured to perform various aspects of the present disclosure.

FIG. 7 depicts an example processing system 700 configured to perform various aspects of the present disclosure, including, for example, the techniques and methods described with respect to FIGS. 1-6. In some aspects, the processing system 700 may correspond to a machine learning system. For example, the processing system 700 may correspond to a system that trains machine learning models (e.g., diffusion models and/or conversion modules) and/or uses trained machine learning models for image generation. Although depicted as a single system for conceptual clarity, in some aspects, as discussed above, the operations described below with respect to the processing system 700 may be distributed across any number of devices or systems.

The processing system 700 includes a central processing unit (CPU) 702, which in some examples may be a multi-core CPU. Instructions executed at the CPU 702 may be loaded, for example, from a program memory associated with the CPU 702 or may be loaded from a memory partition (e.g., a partition of a memory 724).

The processing system 700 also includes additional processing components tailored to specific functions, such as a graphics processing unit (GPU) 704, a digital signal processor (DSP) 706, a neural processing unit (NPU) 708, a multimedia component 710 (e.g., a multimedia processing unit), and a wireless connectivity component 712.

An NPU, such as the NPU 708, is generally a specialized circuit configured for implementing the control and arithmetic logic for executing machine learning algorithms, such as algorithms for processing artificial neural networks (ANNs), deep neural networks (DNNs), random forests (RFs), and the like. An NPU may sometimes alternatively be referred to as a neural signal processor (NSP), tensor processing unit (TPU), neural network processor (NNP), intelligence processing unit (IPU), vision processing unit (VPU), or graph processing unit.

NPUs, such as the NPU 708, are configured to accelerate the performance of common machine learning tasks, such as image classification, machine translation, object detection, and various other predictive models. In some examples, a plurality of NPUs may be instantiated on a single chip, such as a system on a chip (SoC), while in other examples the NPUs may be part of a dedicated neural-network accelerator.

NPUs may be optimized for training or inference, or in some cases configured to balance performance between both. For NPUs that are capable of performing both training and inference, the two tasks may still generally be performed independently.

NPUs designed to accelerate training are generally configured to accelerate the optimization of new models, which is a highly compute-intensive operation that involves inputting an existing dataset (often labeled or tagged), iterating over the dataset, and then adjusting model parameters, such as weights and biases, in order to improve model performance. Generally, optimizing based on a wrong prediction involves propagating back through the layers of the model and determining gradients to reduce the prediction error.

NPUs designed to accelerate inference are generally configured to operate on complete models. Such NPUs may thus be configured to input a new piece of data and rapidly process this piece of data through an already trained model to generate a model output (e.g., an inference).

In some implementations, the NPU 708 is a part of one or more of the CPU 702, the GPU 704, and/or the DSP 706.

In some examples, the wireless connectivity component 712 may include subcomponents, for example, for third generation (3G) connectivity, fourth generation (4G) connectivity (e.g., Long-Term Evolution (LTE)), fifth generation (5G) connectivity (e.g., New Radio (NR)), Wi-Fi connectivity, Bluetooth connectivity, and other wireless data transmission standards. The wireless connectivity component 712 is further coupled to one or more antennas 714.

The processing system 700 may also include one or more sensor processing units 716 associated with any manner of sensor, one or more image signal processors (ISPs) 718 associated with any manner of image sensor, and/or a navigation processor 720, which may include satellite-based positioning system components (e.g., GPS or GLONASS) as well as inertial positioning system components.

The processing system 700 may also include one or more input and/or output devices 722, such as screens, touch-sensitive surfaces (including touch-sensitive displays), physical buttons, speakers, microphones, and the like.

In some examples, one or more of the processors of the processing system 700 may be based on an ARM or RISC-V instruction set.

The processing system 700 also includes a memory 724, which is representative of one or more static and/or dynamic memories, such as a dynamic random access memory, a flash-based static memory, and the like. In this example, the memory 724 includes computer-executable components, which may be executed by one or more of the aforementioned processors of the processing system 700.

In particular, in this example, the memory 724 includes a diffusion component 724A, a conversion component 724B, a decoder component 724C, and a texture component 724D. Although not depicted in the illustrated example, the memory 724 may also include other components, such as a training component to train the machine learning model(s), a generation component to manage the generation of images using the trained machine learning models, and the like. Though depicted as discrete components for conceptual clarity in FIG. 7, the illustrated components (and others not depicted) may be collectively or individually implemented in various aspects.

As illustrated, the memory 724 also includes a set of model parameters 724E (e.g., parameters of one or more machine learning models or components thereof). For example, the model parameters 724E may include parameters for components such as the diffusion model 110, the conversion module 120, and/or the decoder model 130, each of FIG. 1. Although not depicted in the illustrated example, the memory 724 may also include other data such as training data (e.g., training exemplars including text prompts and target meshes).

The processing system 700 further comprises a diffusion circuit 726, a conversion circuit 727, a decoder circuit 728, and a texture circuit 729. The depicted circuits, and others not depicted (such as an inferencing circuit), may be configured to perform various aspects of the techniques described herein.

The diffusion component 724A and/or the diffusion circuit 726 (which may correspond to the diffusion model 110 of FIGS. 1, 3, and/or 4, and/or the diffusion model 210 of FIG. 2) may be used to generate multiview latents and images based on textual prompts, as discussed above. For example, the diffusion component 724A and/or the diffusion circuit 726 may comprise or use machine learning model(s) to iteratively denoise multiview latent tensors in order to generate multiview images having multiple orthographic projections from different views.

The conversion component 724B and/or the conversion circuit 727 (which may correspond to the conversion module 120 of FIG. 1 and/or FIG. 4) may be used to convert multiview data to triplane data, as discussed above. For example, the conversion component 724B and/or the conversion circuit 727 may comprise or use non-parameterized transformations to align corresponding parallel views from the multiview data, and one or more machine learning model(s) to generate triplane latents based on the transformed multiview data.

The decoder component 724C and/or the decoder circuit 728 (which may correspond to the decoder model 130 of FIG. 1) may be used to generate 3D meshes based on input triplane data, as discussed above. For example, the decoder component 724C and/or the decoder circuit 728 may comprise or use machine learning model(s) to decode the triplane data in order to generate meshes.

The texture component 724D and/or the texture circuit 729 may be used to generate and apply textures to 3D meshes, as discussed above. For example, the texture component 724D and/or the texture circuit 729 may generate UV maps and textures based on multiview images.

Though depicted as separate components and circuits for clarity in FIG. 7, the diffusion circuit 726, the conversion circuit 727, the decoder circuit 728, and the texture circuit 729 may collectively or individually be implemented in other processing devices of the processing system 700, such as within the CPU 702, the GPU 704, the DSP 706, the NPU 708, and the like.

Generally, the processing system 700 and/or components thereof may be configured to perform the methods described herein.

Notably, in other aspects, aspects of the processing system 700 may be omitted, such as where the processing system 700 is a server computer or the like. For example, the multimedia component 710, the wireless connectivity component 712, the sensor processing units 716, the ISPs 718, and/or the navigation processor 720 may be omitted in other aspects. Further, aspects of the processing system 700 may be distributed between multiple devices.

EXAMPLE CLAUSES

Implementation examples are described in the following numbered clauses:

Clause 1: A method, comprising: generating a multiview latent tensor based on processing a textual input using a diffusion machine learning model, wherein the multiview latent tensor corresponds to a plurality of orthographic projections corresponding to the textual input; generating a triplane latent tensor based on the multiview latent tensor using a conversion machine learning model; and generating a three-dimensional mesh based on processing the triplane latent tensor using a decoder machine learning model.

Clause 2: A method according to Clause 1, wherein: the textual input specifies an object, and the plurality of orthographic projections correspond to six orthogonal views of the object.

Clause 3: A method according to any of Clauses 1-2, wherein generating the triplane tensor comprises processing the multiview latent tensor, along with a three-dimensional conditioning token, using the diffusion machine learning model to generate an intermediate tensor.

Clause 4: A method according to Clause 3, wherein: generating the multiview latent tensor comprises performing a plurality of iterations of processing data without the three-dimensional condition token using the diffusion machine learning model, and generating the intermediate tensor comprises performing a single iteration of processing data using the diffusion machine learning model.

Clause 5: A method according to any of Clauses 1-4, wherein generating the triplane latent tensor comprises: for each respective pair of parallel orthographic projections, from the plurality of orthographic projections, the respective pair corresponding to opposite views of an object specified in the textual input: realigning at least one orthographic projection of the respective pair of parallel orthographic projections to match orientations; and concatenating the realigned respective pair of parallel orthographic projections; and processing the concatenated orthographic projections using the conversion machine learning model.

Clause 6: A method according to any of Clauses 1-5, further comprising: generating a multiview image based on the multiview latent tensor; generating a two-dimensional texture based on the multiview image; and texturing the three-dimensional mesh based on the two-dimensional texture.

Clause 7: A method according to Clause 6, wherein generating the two-dimensional texture comprises: generating a UV mapping based on the three-dimensional mesh; initializing the two-dimensional texture based on mapping each texel in the two-dimensional texture to a corresponding point on the three-dimensional mesh, based on the UV mapping; and projecting the multiview image into the initialized two-dimensional texture.

Clause 8: A method according to any of Clauses 6-7, further comprising: generating a plurality of textures using the diffusion machine learning model, each of the plurality of textures corresponding to a respective texture modality; and texturing the three-dimensional mesh based further on the plurality of textures.

Clause 9: A method according to any of Clauses 1-8, further comprising: generating an auxiliary multiview latent tensor using the diffusion machine learning model; and generating the triplane latent tensor based on both the multiview latent tensor and the auxiliary multiview latent tensor.

Clause 10: A method according to Clause 9, wherein the auxiliary multiview latent tensor is a relatively lower resolution, as compared to the multiview latent tensor.

Clause 11: A method according to any of Clauses 1-10, further comprising: rendering an image depicting the three-dimensional mesh; and outputting the rendered image via a display.

Clause 12: A processing system comprising: a memory comprising computer-executable instructions; and one or more processors configured to execute the computer-executable instructions and cause the processing system to perform a method in accordance with any of Clauses 1-11.

Clause 13: A processing system comprising means for performing a method in accordance with any of Clauses 1-11.

Clause 14: A non-transitory computer-readable medium comprising computer-executable instructions that, when executed by one or more processors of a processing system, cause the processing system to perform a method in accordance with any of Clauses 1-11.

Clause 15: A computer program product embodied on a computer-readable storage medium comprising code for performing a method in accordance with any of Clauses 1-11.

ADDITIONAL CONSIDERATIONS

The preceding description is provided to enable any person skilled in the art to practice the various aspects described herein. The examples discussed herein are not limiting of the scope, applicability, or aspects set forth in the claims. Various modifications to these aspects will be readily apparent to those skilled in the art, and the generic principles defined herein may be applied to other aspects. For example, changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

As used herein, the word "exemplary" means "serving as an example, instance, or illustration." Any aspect described herein as "exemplary" is not necessarily to be construed as preferred or advantageous over other aspects.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining, and the like. Also, "determining" may include receiving (e.g., receiving information), accessing (e.g., accessing data in a memory), and the like. Also, "determining" may include resolving, selecting, choosing, establishing, and the like.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The following claims are not intended to be limited to the aspects shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112 (f) unless the element is expressly recited using the phrase "means for" or, in the case of a method claim, the element is recited using the phrase "step for." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A processing system comprising:

one or more memories comprising processor-executable instructions; and one or more processors configured to execute the processor-executable instructions and cause the processing system to:

generate a multiview latent tensor based on processing input using a diffusion machine learning model, wherein the multiview latent tensor corresponds to a plurality of orthographic projections corresponding to the input;

generate a triplane latent tensor based on the multiview latent tensor using a conversion machine learning model, wherein to generate the triplane latent tensor, the one or more processors are configured to realign a first pair of orthographic projections in the multiview latent tensor based on aligning a first orthographic projection of the first pair of orthographic projections to match orientations with a second orthographic projection of the first pair of orthographic projections; and generate a three-dimensional mesh based on processing the triplane latent tensor using a decoder machine learning model.

2. The processing system of claim 1, wherein:

the input specifies an object, and the plurality of orthographic projections correspond to six orthogonal views of the object.

3. The processing system of claim 1, wherein, to generate the triplane latent tensor, the one or more processors are configured to execute the processor-executable instructions and cause the processing system to process the multiview latent tensor, along with a three-dimensional conditioning token, using the diffusion machine learning model to generate an intermediate tensor.

4. The processing system of claim 3, wherein:

to generate the multiview latent tensor, the one or more processors are configured to execute the processor-executable instructions and cause the processing system to perform a plurality of iterations of processing data without the three-dimensional conditioning token using the diffusion machine learning model, and to generate the intermediate tensor, the one or more processors are configured to execute the processor-executable instructions and cause the processing system to perform a single iteration of processing data using the diffusion machine learning model.

5. The processing system of claim 1, wherein to generate the triplane latent tensor, the one or more processors are configured to execute the processor-executable instructions and further cause the processing system to:

for each respective pair of parallel orthographic projections, from the plurality of orthographic projections, the respective pair corresponding to opposite views of an object specified in the input:

realign at least one orthographic projection of the respective pair of parallel orthographic projections to match orientations; and concatenate the realigned respective pair of parallel orthographic projections; and process the concatenated orthographic projections using the conversion machine learning model.

6. The processing system of claim 1, wherein the one or more processors are configured to further execute the processor-executable instructions and cause the processing system to:

generate a multiview image based on the multiview latent tensor;

generate a two-dimensional texture based on the multiview image; and texture the three-dimensional mesh based on the two-dimensional texture.

7. The processing system of claim 6, wherein, to generate the two-dimensional texture, the one or more processors are configured to execute the processor-executable instructions and cause the processing system to:

generate a UV mapping based on the three-dimensional mesh;

initialize the two-dimensional texture based on mapping each texel in the two-dimensional texture to a corresponding point on the three-dimensional mesh, based on the UV mapping; and project the multiview image into the initialized two-dimensional texture.

8. The processing system of claim 6, wherein the one or more processors are configured to further execute the processor-executable instructions and cause the processing system to:

generate a plurality of textures using the diffusion machine learning model, each of the plurality of textures corresponding to a respective texture modality; and texture the three-dimensional mesh based further on the plurality of textures.

9. The processing system of claim 1, wherein the one or more processors are configured to further execute the processor-executable instructions and cause the processing system to:

generate an auxiliary multiview latent tensor using the diffusion machine learning model; and generate the triplane latent tensor based on both the multiview latent tensor and the auxiliary multiview latent tensor.

10. The processing system of claim 9, wherein the auxiliary multiview latent tensor is a relatively lower resolution, as compared to the multiview latent tensor.

11. The processing system of claim 1, wherein the one or more processors are configured to further execute the processor-executable instructions and cause the processing system to:

render an image depicting the three-dimensional mesh; and output the rendered image via a display.

12. A processor-implemented method of machine learning, comprising:

generating a multiview latent tensor based on processing input using a diffusion machine learning model, wherein the multiview latent tensor corresponds to a plurality of orthographic projections corresponding to the input;

generating a triplane latent tensor based on the multiview latent tensor using a conversion machine learning model, comprising realigning a first pair of orthographic projections in the multiview latent tensor based on aligning a first orthographic projection of the first pair of orthographic projections to match orientations with a second orthographic projection of the first pair of orthographic projections; and generating a three-dimensional mesh based on processing the triplane latent tensor using a decoder machine learning model.

13. The processor-implemented method of claim 12, wherein:

the input specifies an object, and the plurality of orthographic projections correspond to six orthogonal views of the object.

14. The processor-implemented method of claim 12, wherein generating the triplane latent tensor comprises processing the multiview latent tensor, along with a three-dimensional conditioning token, using the diffusion machine learning model to generate an intermediate tensor.

15. The processor-implemented method of claim 14, wherein:

generating the multiview latent tensor comprises performing a plurality of iterations of processing data without the three-dimensional conditioning token using the diffusion machine learning model, and generating the intermediate tensor comprises performing a single iteration of processing data using the diffusion machine learning model.

16. The processor-implemented method of claim 12, wherein generating the triplane latent tensor further comprises:

for each respective pair of parallel orthographic projections, from the plurality of orthographic projections, the respective pair corresponding to opposite views of an object specified in the input:

realigning at least one orthographic projection of the respective pair of parallel orthographic projections to match orientations; and concatenating the realigned respective pair of parallel orthographic projections; and processing the concatenated orthographic projections using the conversion machine learning model.

17. The processor-implemented method of claim 12, further comprising:

generating a multiview image based on the multiview latent tensor;

generating a two-dimensional texture based on the multiview image; and texturing the three-dimensional mesh based on the two-dimensional texture.

18. The processor-implemented method of claim 17, wherein generating the two-dimensional texture comprises:

generating a UV mapping based on the three-dimensional mesh; and initializing the two-dimensional texture based on mapping each texel in the two-dimensional texture to a corresponding point on the three-dimensional mesh, based on the UV mapping; and projecting the multiview image into the initialized two-dimensional texture.

19. The processor-implemented method of claim 12, further comprising:

generating an auxiliary multiview latent tensor using the diffusion machine learning model; and generating the triplane latent tensor based on both the multiview latent tensor and the auxiliary multiview latent tensor.

20. One or more non-transitory computer-readable media comprising processor-executable instructions that, when executed by one or more processors of a processing system, cause the processing system to:

generate a multiview latent tensor based on processing a textual input using a diffusion machine learning model, wherein the multiview latent tensor corresponds to a plurality of orthographic projections corresponding to the input;

generate a triplane latent tensor based on the multiview latent tensor using a conversion machine learning model, comprising realigning a pair of orthographic projections in the multiview latent tensor based on aligning a first orthographic projection of the pair of orthographic projections to match orientations with a second orthographic projection of the pair of orthographic projections; and generate a three-dimensional mesh based on processing the triplane latent tensor using a decoder machine learning model.

* * * * *